(12) United States Patent
Matsuoka (10) Patent No.: US 7,876,984 B2
(45) Date of Patent: Jan. 25, 2011

(54) PLANAR OPTICAL WAVEGUIDE ARRAY MODULE AND METHOD OF FABRICATING THE SAME

(75) Inventor: Yasunobu Matsuoka, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 12/470,502

(22) Filed: May 22, 2009

(65) Prior Publication Data

US 2009/0297095 A1    Dec. 3, 2009

(30) Foreign Application Priority Data

May 30, 2008    (JP) ............... 2008-142313

(51) Int. Cl.
*G02B 6/12* (2006.01)
*G02B 6/26* (2006.01)

(52) U.S. Cl. .......................... 385/14; 385/50

(58) Field of Classification Search ............. 385/14, 385/24, 37, 39, 50, 88, 89; 264/1.28; 427/163.2
See application file for complete search history.

(56) References Cited

U.S. PATENT DOCUMENTS

| | | | | |
|---|---|---|---|---|
| 6,775,441 B2 * | 8/2004 | Kikuchi et al. | ............... | 385/50 |
| 6,791,675 B2 * | 9/2004 | Kikuchi et al. | ............... | 356/50 |
| 7,424,188 B2 * | 9/2008 | Aoki | ............... | 385/40 |
| 2009/0245801 A1 * | 10/2009 | Little et al. | ............... | 398/89 |

FOREIGN PATENT DOCUMENTS

JP    2005-292379    10/2005

* cited by examiner

*Primary Examiner*—Akm E Ullah
(74) *Attorney, Agent, or Firm*—Antonelli, Terry, Stout & Kraus, LLP.

(57) ABSTRACT

The optical element array and an optical waveguide array are optically connected on the substrate. The optical waveguide array includes optical waveguide channels which are the outermost optical waveguide channels on both sides of optical waveguide array channels and each of which is provided with a mirror structure for light redirection. With the optical element array driven by a bias applied thereto, the optical waveguide array is brought near the optical element array. The optical axes of the optical waveguide array channels and the optical element array are aligned while monitoring optical signals outputted from the outermost optical waveguide channels on both sides of the optical waveguide array channels via the mirror structures for light redirection. The optical waveguide array is fixed to the substrate in such a position that the optical signals have a desired output value.

14 Claims, 10 Drawing Sheets

PLANAR OPTICAL WAVEGUIDE ARRAY MODULE AND METHOD OF FABRICATING THE SAME

CLAIM OF PRIORITY

The present application claims priority from Japanese patent application JP 2008-142313 filed on May 30, 2008, the content of which is hereby incorporated by reference into this application.

BACKGROUND OF THE INVENTION

1. Field of the Invention

The present invention relates to a planar optical waveguide array module which is used as a terminal for transmitting high-speed optical signals using optical waveguides as optical wiring media between chips or between boards included, for example, in a data processing device or in different data processing devices.

2. Description of the Related Art

In the field of information and communication, the environment for exchanging large-volume data at high speed using an optical means has been rapidly enhanced in recent years. Up to the present, optical fiber networks such as backbone networks, metro networks, and access networks for relatively long distances, i.e. for several kilometers or longer, have been expanded. From now on, it will be effective to expedite the introduction of optical fibers as transmission lines in order to allow large-volume data to be transmitted without delay over very short distances, too, for example, between transmission devices (several meters to several hundred meters) or even within a device (several centimeters to several tens of centimeters).

When optical wiring is employed for data transmission between transmission devices, for example, routers and switches, or within one of such devices, a high-frequency signal received by one of such devices via an optical fiber, for example, from Ethernet is inputted to one of several line cards connected to a backplane. Signals inputted to such line cards are sent to a switch card via the backplane to be returned to the line cards after being processed by an LSI of the switch card. In existing cases, signals are transmitted from such line cards to a switch card via a backplane at a rate of 300 Gbits/s or higher. If electrical transmission lines are to be used, such a high rate of signal transmission requires ten or more lines, as it is necessary to divide the transmission not to exceed a transmission rate of 1 to 3 Gbits/s per line with transmission loss taken into account.

In addition, using high-frequency transmission lines makes it necessary to prepare waveform shaping circuits and measures against reflection and crosstalk between lines. As communication systems grow larger in capacity making it necessary for each device to process data at a rate of Tbits/s or higher, severer problems will be posed, for example, concerning the number of electrical transmission lines to be used and crosstalk between lines. If optical transmission lines are used between boards included in intra-device line cards, a backplane, or a switch card, or between intra-board chips, high-frequency signals can be transmitted at a rate of 10 Gbits/s or higher per line with a small transmission loss. In this case compared with cases where electrical transmission lines are used, the number of lines required can be reduced and it becomes unnecessary to take measures against crosstalk between lines. Thus, using optical transmission lines as described above is a promising approach. Besides routers and switches mentioned above, video devices like video cameras and other consumer devices such as personal computers and cell-phones will also be required, as they come to offer higher image definition, to be capable of high-speed, large-volume image signal transmission between their monitors and terminals. Using electrical transmission lines for such high-speed, large-volume signal transmission will make problems such as transmission delays and noise more conspicuous. To avoid such problems, using optical transmission lines is a promising approach.

To realize high-speed optical interconnection circuits as described above and apply such circuits for inter-device and intra-device signal transmission, it is necessary to realize optical modules and circuits which can be fabricated by an economical means and which excel in terms of performance, compactness, integration, and mountability. Under such circumstances, a compact, high-speed planar waveguide module formed by integrating optical parts and optical waveguides, which are, as optical wiring media, less expensive and more advantageous in achieving high integration density than existing optical fibers, has been proposed.

Figure 9:
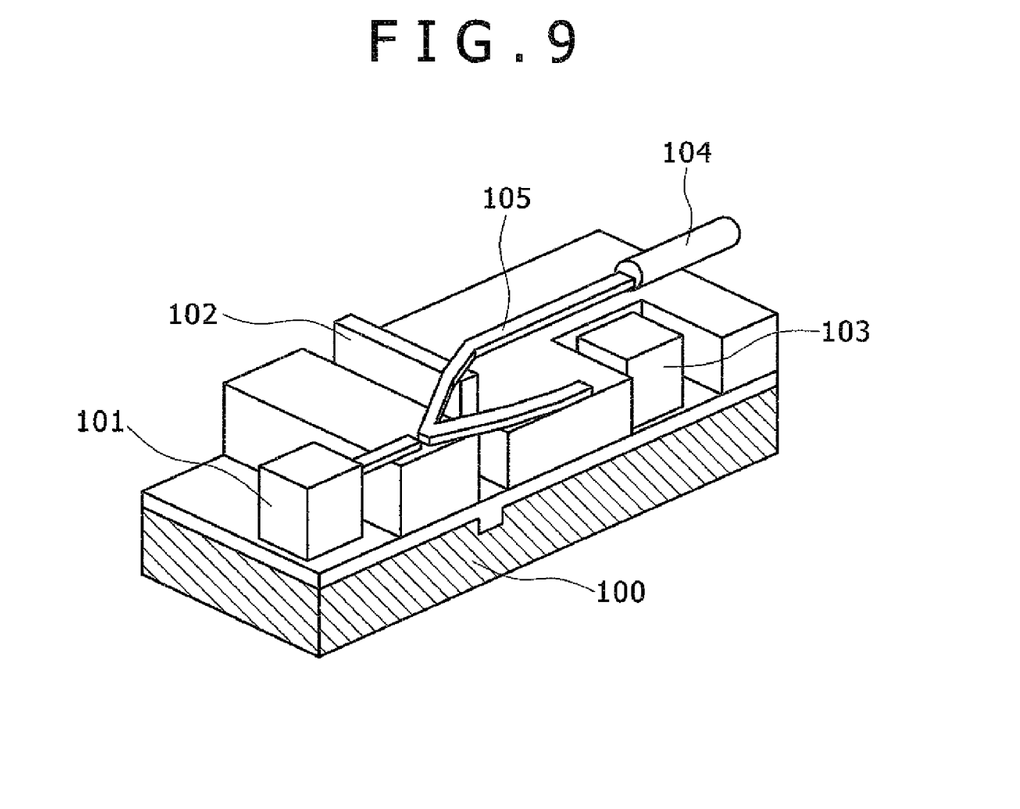
FIG. 9 shows a basic configuration of a planar lightwave circuit (PLC) module which is an example of an existing planar optical waveguide module.

FIG. 9 shows a basic configuration of a planar lightwave circuit (PLC) module, shown as an example of an existing planar optical waveguide module, including optical parts such as optical elements and optical waveguides mounted on a same substrate. In the configuration, such optical parts as optical elements 101 and 103 (for example, a laser diode and a photodiode) and a filter 102 can be integrated on a platform substrate 100. Therefore, the number of parts required can be reduced and the module can be made smaller. Since optical axis alignment is performed by a passive alignment method, that is, the optical axes of optical parts are aligned when the optical parts are mounted on a platform substrate 100, the number of part mounting steps to be performed in fabricating the module can be reduced.

Another example of an existing type of a planar optical waveguide module is disclosed in JP-A No. 2005-292379. The module includes an optical element array mounted on a substrate and a discrete film optical waveguide array optically connected to the optical element array. In the module, the film optical waveguide array is fixed to a support member provided on the element mounting substrate by concave-convex fitting. To make the concave-convex fitting possible, concaves and convexes are formed on the film optical waveguide array using a transfer substrate. This simplifies the optical module fabrication process and reduces the cost of the optical module.

In the case of the PLC module shown in FIG. 9 as an example of an existing type of a planar optical waveguide module, the optical axes of optical elements are aligned, while monitoring alignment marks provided on the platform substrate 100, by a passive alignment method. Namely, their axes are aligned based only on their positional accuracy on the platform substrate 100. In such a case, the positioning margins for accurately positioning different optical parts on the same substrate are small, so that it is difficult to secure satisfactory optical performance of the module. Moreover, when a module to be fabricated includes optical elements and optical waveguides for multiple channels, it becomes further difficult to achieve a satisfactory yield of modules securing stable optical contact. The performance of such optical parts to be mounted on a substrate can be evaluated only after all the optical parts are mounted on the substrate. Namely, in the case of the above planar optical waveguide module, inspecting individual optical parts in a stage of mounting on a substrate is extremely difficult. This results in a low optical module production yield.

In the planar optical waveguide module disclosed in JP-A No. 2005-292379, too, a discrete film optical waveguide array is optically connected to an optical element array by a passive mounting method, i.e. by concave-convex fitting the film optical waveguide array to a support member provided on the element mounting substrate. Whereas the method makes module fabrication easy, the part positioning accuracy that is a factor in obtaining stable optical connection between optical parts is dependent on the optical part production accuracy. Hence, there is a limit to enhancing the optical part positioning accuracy. Particularly, to achieve efficient optical connection, for example, between a fine optical wiring with a core diameter of several microns for a single-mode optical waveguide and an optical element, a part mounting accuracy on the order of one micron or so is required. When arrayed waveguides are used, a stricter part positioning accuracy is required.

SUMMARY OF THE INVENTION

The present invention has been made under the above circumstances, and it is an object of the present invention to provide a planar optical waveguide array module, a method of fabricating the same, and an Opto Electronic Integrated Circuit for processing signals on a circuit board using the planar optical waveguide array module. The planar optical waveguide array module is used as a terminal for transmitting, by using optical waveguides as optical wiring media, optical signals at high speed between chips or between boards included, for example, in a data processing device or in different data processing devices. The planar optical waveguide array module realizes accurate and stable optical connection between an optical element array and an optical waveguide array, and can be fabricated in a simplified way.

To achieve the above object, the present invention provides a method of fabricating a planar optical waveguide array module including an optical waveguide array and an optical element array. The optical waveguide array includes at least two optical waveguide channels each having an optical wiring core which is enclosed in a cladding layer and which is formed of a material with a refractive index higher than that of the cladding layer. The outermost optical waveguide channels on both sides of the optical waveguide array are each provided with a mirror structure for redirecting light coming through the optical waveguide channel extending in parallel with the horizontal substrate surface into a direction perpendicular to the horizontal substrate surface. The optical waveguide array is formed of a flexible material which can be bent with an optional curvature. The optical element array includes at least two optical element arrays provided on a substrate. In the waveguide array module, the outermost optical element channels on both sides of the optical element array and the outermost optical waveguide channels on both sides of the optical waveguide array are optically connected to each other via the mirror structures for light redirection. In the method of fabricating a planar optical waveguide array module according to the present invention, with the optical element array driven by a bias applied thereto, the optical waveguide array is brought near the optical element array, and the optical axes of the optical waveguide array and the optical element array are aligned while monitoring output signals outputted from the outermost optical waveguide channels on both sides of the optical waveguide array or from the outermost optical element channels on both sides of the optical element array. The optical waveguide array is fixed to the substrate in such a position that the output signals have a desired value.

The present invention also provides a planar optical waveguide array module having a flexible printed circuit board which is formed on the upper surface of the optical waveguide array and which includes an electrical wiring. The flexible printed circuit board is provided, in each portion thereof directly above one of the mirror structures for light redirection, with a surface illuminated type photodiode for optical signal monitoring.

The present invention also provides an Opto Electronic Integrated Circuit including a first planar optical waveguide array module which includes a laser element array mounted on the substrate and a second planar optical waveguide array module which includes a light-receiving element array of at least two channels formed on the substrate. The first planar optical waveguide array module includes an optical waveguide array which is optically connected to the second planar optical waveguide array module.

According to the fabrication method of the present invention, with the optical element array driven by a bias applied thereto, the optical waveguide array is brought near the optical element array, and the optical axes of the optical waveguide array and the optical element array are aligned while monitoring output signals outputted from the outermost optical waveguide channels on both sides of the optical waveguide array or from the outermost optical element channels on both sides of the optical element array. This method makes it possible to optically connect a film optical waveguide array and an optical element array highly efficiently and stably.

Each of the outermost optical waveguide channels on both sides of the optical waveguide array is provided with a mirror structure for light redirection. This makes it possible to monitor from above the optical signals which are received from optical elements (i.e. laser elements in the present example) optically connected to the optical waveguide array and then transmitted through the outermost optical waveguide channels extending along the horizontal substrate surface. Therefore, optical waveguides can be connected to optical connectors, or optical waveguides supported by a jig can be mounted on a board with ease while monitoring the optical signals.

The present invention also provides a planar optical waveguide array module in which a flexible printed circuit board having electrical wirings is formed on the surface of an optical waveguide array and in which surface illuminated type photodiodes for optical signal monitoring are mounted on the surface of the flexible printed circuit board, each to be directly above a mirror structure for light redirection. In this configuration, it is possible to align the optical axes of the optical waveguide array and an optical element array while monitoring electrical signals generated, at the light-receiving elements, by photoelectrically converting optical signals which are received from optical elements (i.e. laser elements in the present example) optically connected to the optical waveguide array, transmitted through optical waveguide channels extending along the horizontal substrate surface and then redirected by the mirror structures. This configuration does not require optical connectors, so that the part mounting process to be performed to fabricate the optical waveguide array module can be simplified resulting in higher productivity. Even after the optical waveguide array is mounted on the substrate, the surface illuminated type photodiodes can be used as monitor photodiodes for monitoring optical signals received from the laser elements via the optical waveguides, so that they can facilitate further simplification of the part mounting process.

The present invention can also provide an Opto Electronic Integrated Circuit having a first planar optical waveguide array module which, having been fabricated and configured as described above, includes a laser element array mounted on the substrate and a second planar optical waveguide array module which, having been fabricated and configured as described above, includes a light-receiving element array mounted on the substrate. The first planar optical waveguide array module includes an optical waveguide array which is optically connected to the second planar optical waveguide array module. The Opto Electronic Integrated Circuit configured as described above can be fabricated economically at high productivity.

DETAILED DESCRIPTION OF THE PREFERRED EMBODIMENTS

Embodiments of the present invention will be described in detail below.

Embodiment 1

Figure 1A:
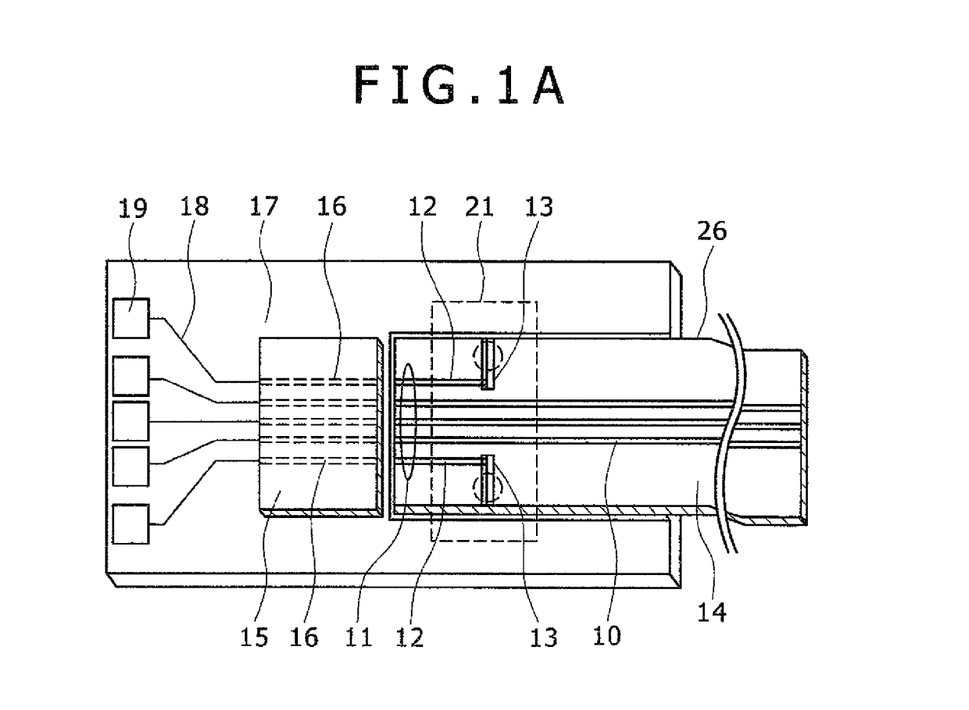
FIG. 1A is a plan view of a planar optical waveguide array module according to a first embodiment of the present invention.
Figure 1B:
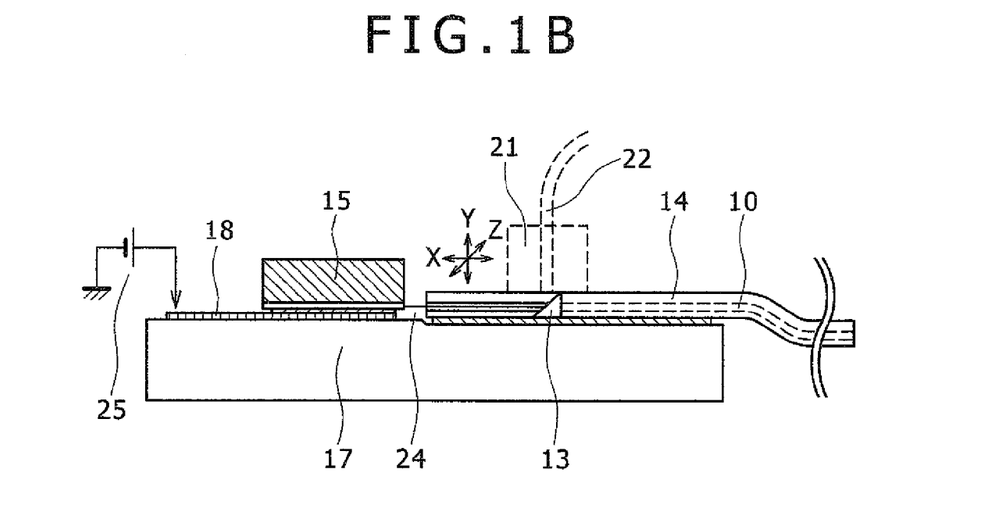
FIG. 1B is a sectional view of the planar optical waveguide array module according to the first embodiment of the present invention.

FIGS. 1A and 1B are a plan view and a sectional view, respectively, of a planar optical waveguide array module according to a first embodiment of the present invention. An optical element array 15 is disposed on a substrate 17. The optical element array 15 and an optical waveguide array 26 are optically connected on the substrate 17. The optical waveguide array 26 includes optical waveguide channels 12 which are the outermost ones on both sides of optical waveguide array channels 11 and each of which is provided with a mirror structure for light redirection 13. The planar optical waveguide array module is fabricated through steps outlined as follows: with the optical element array 15 driven by a bias 25 applied thereto, the optical waveguide array 26 is brought near the optical element array 15; the optical axes of the optical waveguide array channels 11 and the optical element array 15 are aligned while monitoring optical signals 24 outputted from the outermost optical waveguide channels 12 on both sides of the optical waveguide array channels 11 via the mirror structures for light redirection 13; and the optical waveguide array 26 is fixed to the substrate 17 in such a position that the optical signals 24 have a desired output value.

With reference to FIGS. 2A to 2I, the procedure for fabricating the planar optical waveguide array module according to the first embodiment of the present invention will be described in detail.

Figure 2A:
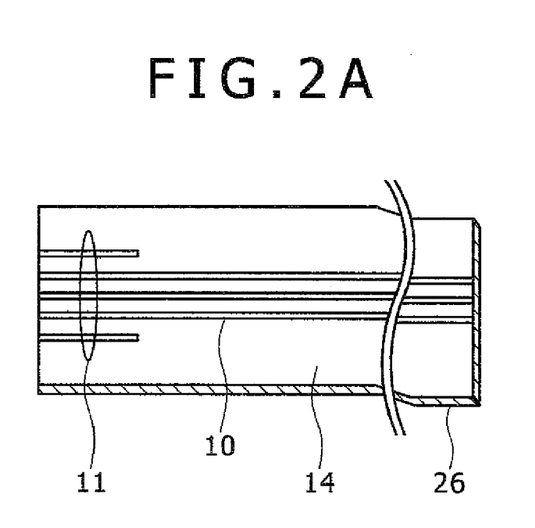
FIG. 2A is a plan view showing an optical waveguide array which is an optical wiring portion of the planar optical waveguide array module according to the first embodiment of the present invention.

FIG. 2A shows the optical waveguide array 26 which is an optical wiring portion of the planar optical waveguide array module according to the present embodiment. First, the optical waveguide array 26 is fabricated. The optical waveguide array 26 has, as shown in FIG. 2A, the optical waveguide array channels 11 including at least two wiring cores 10 (optical waveguide channels). The wiring cores 10 are enclosed in a cladding layer 14 and formed of a material with a refractive index higher than that of the cladding layer 14. The material of which the optical waveguide array 26 is formed is required to be one, for example, a polymer resin, which is transparent for the light of the optical wavelength to be used and which is flexible to be bendable with a required curvature.

Figure 2B:
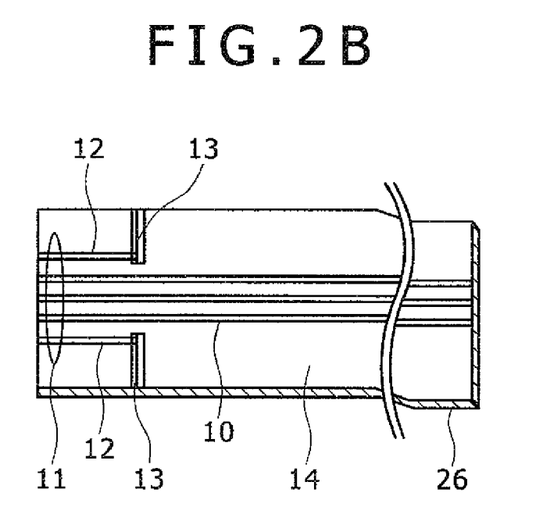
FIG. 2B is a plan view of the optical waveguide array in a state in which the outermost optical waveguide channels on both sides of optical waveguide array channels are each provided with a mirror structure for light redirection.
Figure 2C:
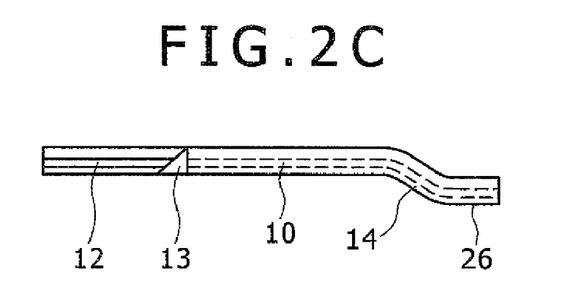
FIG. 2C is a sectional view of the optical waveguide array in the state shown in FIG. 2B.

Next, as shown in FIGS. 2B and 2C, each of the outermost optical waveguide channels 12 on both sides of the optical waveguide array channels 11 is provided with the mirror structure 13 for redirecting light transmitted in the optical waveguide extending in a direction parallel with the horizontal substrate surface into a direction perpendicular to the horizontal substrate surface. The mirror structure 13 for light redirection may be formed in an optional way. It may be formed, for example, by dice cutting, laser irradiation, lithographic patterning, or by mounting a separately prepared mirror part directly to the optical waveguide. The mirror inclination angle is preferably about 45 degrees so that the light transmitted in a direction parallel with the horizontal substrate surface can be redirected by 90 degrees.

Figure 2D:
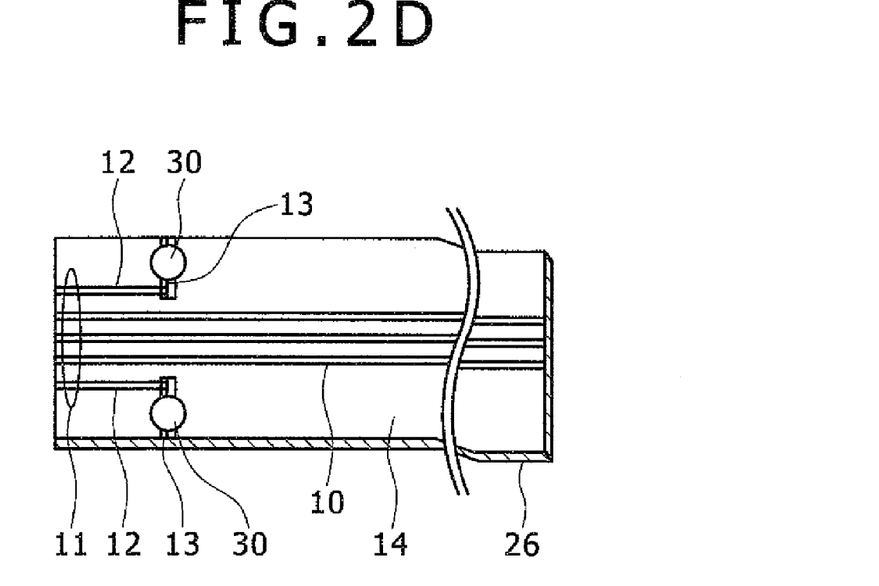
FIG. 2D is a plan view of the optical waveguide array in a state in which a positioning guide hole is provided outside each of the outermost optical waveguide channels on both sides of the optical waveguide array channels.

FIG. 2D is a plan view of the optical waveguide array 26 with a positioning guide hole 30 formed outside each of the outermost optical waveguide channels 12 on both sides of the optical waveguide array channels 11. Installing an optical fiber connector having a guide pin structure being described later in the guide holes 30 enables optical axis alignment between the optical waveguide array channels 11 and the optical element channels. The guide holes 30 may be formed by any appropriate method, for example, by etching, drilling, or using laser.

Figure 2E:
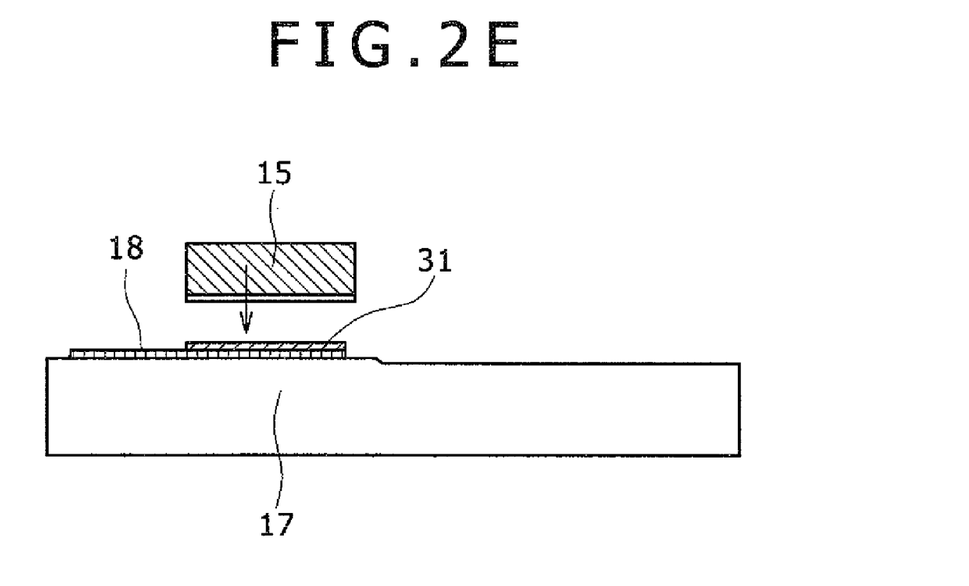
FIG. 2E is a diagram showing a manner in which an optical element array is mounted on a substrate.

FIG. 2E is a diagram showing a manner in which the optical element array 15 is mounted on the substrate 17. The substrate 17 is a semiconductor, for example, ceramic or silicon. An electrical wiring 18 and a solder pattern 31 for soldering the optical element array 15 are formed on the surface of the substrate 17. To mount the optical element array 15, the solder pattern 31 is heat-melted with the optical element array 15 held in close contact with the solder pattern 31. The optical element array 15 includes edge emitting laser diodes for a transmitter module or edge illuminated type photodiodes for a receiver module.

Figure 2F:
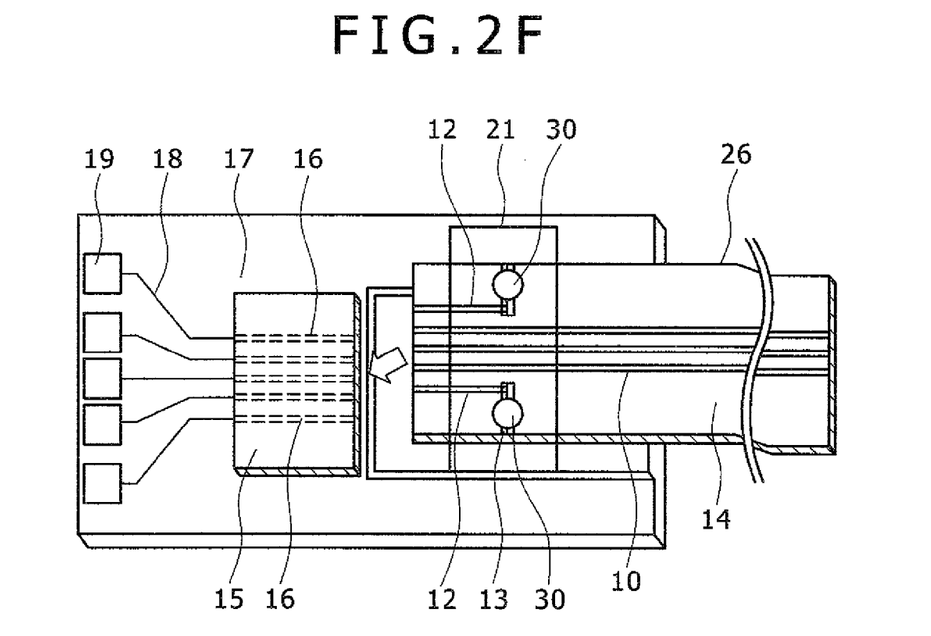
FIG. 2F is a plan view showing a manner in which the optical waveguide array with an optical fiber connector fitted to the guide holes therein is brought near the substrate mounted with the optical element array.
Figure 2G:
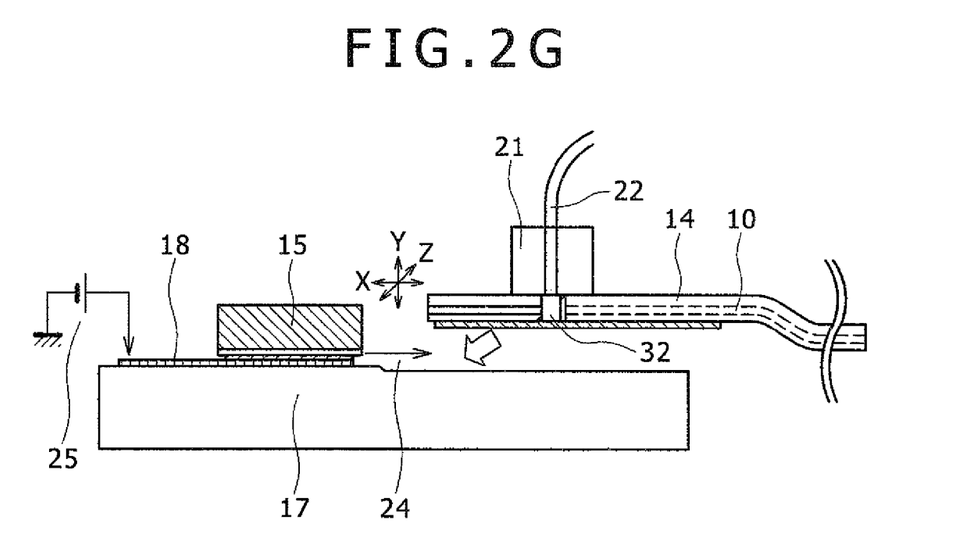
FIG. 2G is a sectional view showing the manner in which the optical waveguide array with an optical fiber connector fitted to the guide holes therein is brought near the substrate mounted with the optical element array.

Next, as shown in FIGS. 2F and 2G, an optical fiber connector 21 having a guide pin structure is fitted to the guide holes formed in the optical waveguide array 26, and the optical waveguide array 26 is brought near the substrate 17 on which the optical element array 15 is mounted. Then, with the optical element array 15 (including laser elements in the present example) driven (emitting light) by the bias 25 applied thereto via electrode pads 19 and the electrical wiring 18, optical signals transmitted through the outermost optical element channels 16 on both sides of the optical element array 15 are inputted to optical fibers 22 via the outermost optical waveguide channels 12 on both sides of the optical waveguide array channels 11 and the mirror structures 13 for light redirection. Subsequently, the optical axes of the optical waveguide array 26 and the optical element array 15 are aligned by moving the optical waveguide array 26 in X, Y, and Z directions. This is done while monitoring the optical signals inputted to the optical fibers. The optical waveguide array 26 is fixed to the substrate 17 in such a position that the optical signals each have a desired output value.

Figure 2H:
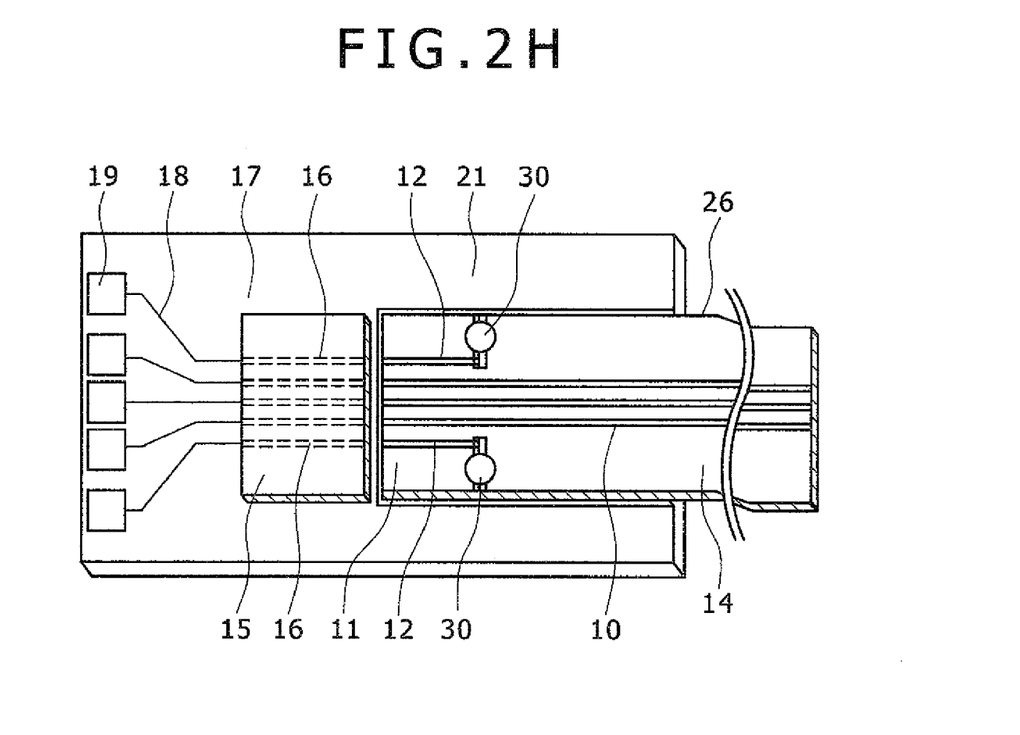
FIG. 2H is a plan view of the planar optical waveguide array module fabricated by the method illustrated in FIGS. 2A to 2G.
Figure 2I:
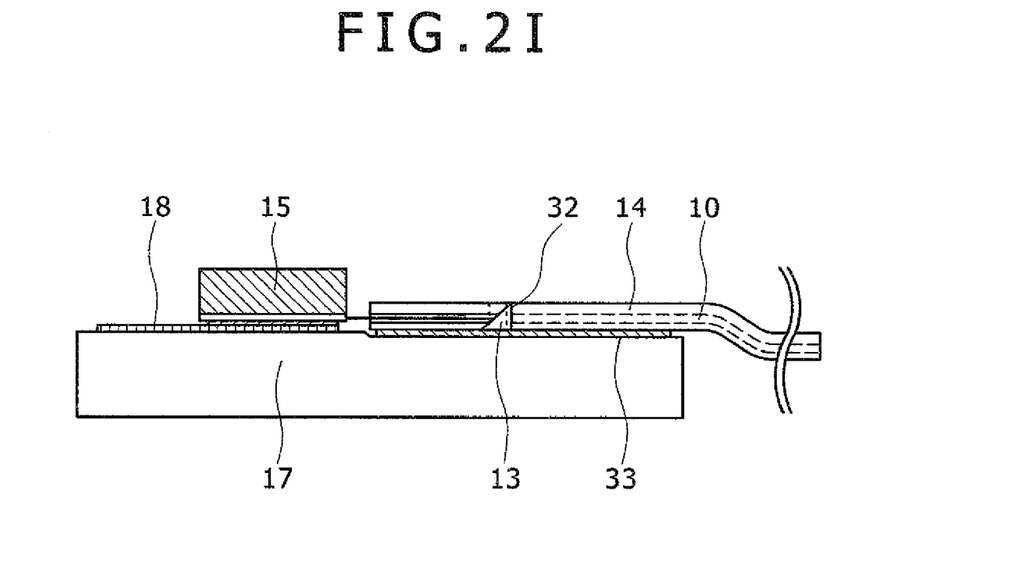
FIG. 2I is a sectional view of the planar optical waveguide array module fabricated by the method illustrated in FIGS. 2A to 2E.

FIGS. 2H and 2I are diagrams showing a planar optical waveguide array module fabricated by the fabrication method described above with reference to FIGS. 2A to 2G. The optical connector 21 is removed from the optical waveguide array 26 after, as described with reference to FIGS. 2F and 2G, the optical axes of the optical element array 15 and optical waveguide array 26 are aligned and the optical waveguide array 26 is fixed to the substrate 17. The optical waveguide array 26 is fixed to the substrate 17 using, for example, an adhesive 33.

Embodiment 2

Figure 3A:
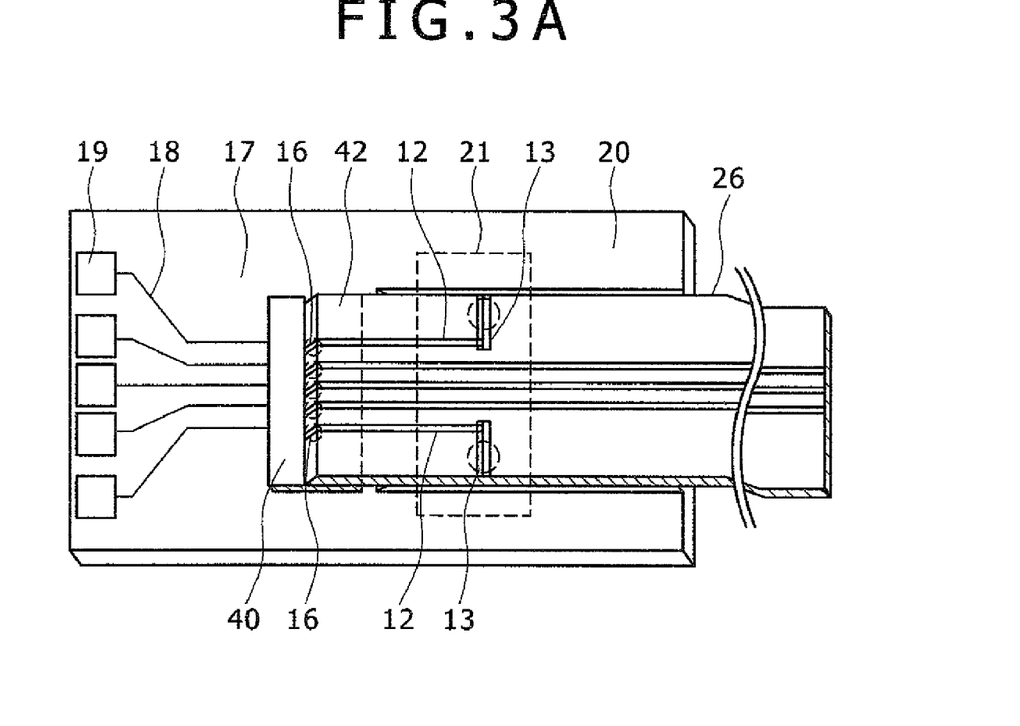
FIG. 3A is a plan view of a planar optical waveguide array module, including a surface light-emitting diode array, according to a second embodiment of the present invention.
Figure 3B:
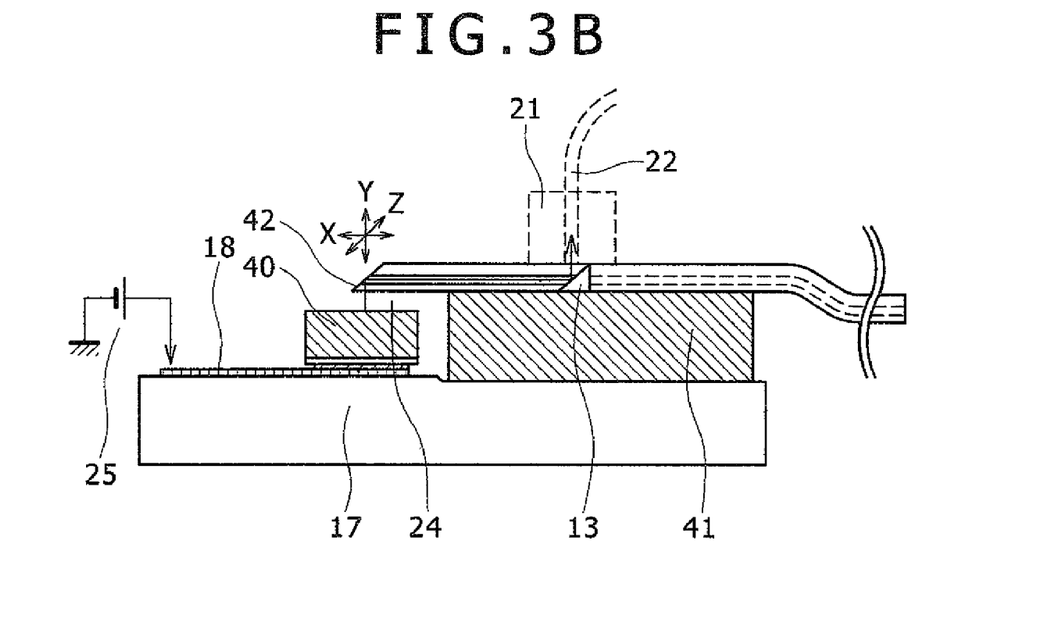
FIG. 3B is a sectional view of the planar optical waveguide array module shown in FIG. 3A.

FIGS. 3A and 3B are a plan view and a sectional view, respectively, of a planar optical waveguide array module, including a surface light-emitting diode array, according to a second embodiment of the present invention. In this embodiment, a laser element array 40 mounted on a substrate 17 is a surface light-emitting diode array which emits light in a vertical direction to the element surface. To fabricate the planar optical waveguide array module according to the second embodiment, an optical waveguide array 26 is brought near the laser element array 40. The optical waveguide array 26 includes, in addition to a first mirror structure 13 for light redirection provided for each of the outermost optical waveguide channels 12 on both sides of optical waveguide array channels, a second mirror structure 42 formed in an end portion thereof. The subsequent fabrication steps are similar to those described with reference to FIGS. 2A to 2F. Namely, with the surface light-emitting diode array 40 driven by a bias 25 applied thereto via electrode pads 19 and electrical wirings 18, optical signals transmitted through the optical element channels 16, i.e. the outermost optical element channels on both sides of the surface light-emitting diode array 40 are, after being redirected by the second mirror structure 42, inputted to optical fibers 22 via the optical waveguide channels 12, i.e. the outermost ones on both sides of the optical waveguide array channels and the first mirror structures 13. The optical axes of the optical waveguide array 26 and the surface light-emitting diode array 40 are then aligned by moving the optical waveguide array 26 in X, Y, and Z directions. This is done while monitoring the optical signals inputted to the optical fibers. The optical waveguide array 26 is fixed to a support member 41 on the substrate 17 in such a position that the optical signals 24 have a desired value. The support member 41 disposed between the optical waveguide array 26 and the substrate 17 has a thickness which causes the distance between the surface light-emitting diode array 40 and the optical waveguide array 26 to be as desired. The support member 41 is made of a material with a thermal expansion coefficient equal to or intermediate between those of the optical waveguide array 26 and the substrate 17. Using such a material is effective in preventing the optical waveguide array 26 and the substrate 17 from being shifted relative to each other due to thermal expansion caused when they are fixed together.

Embodiment 3

Figure 4:
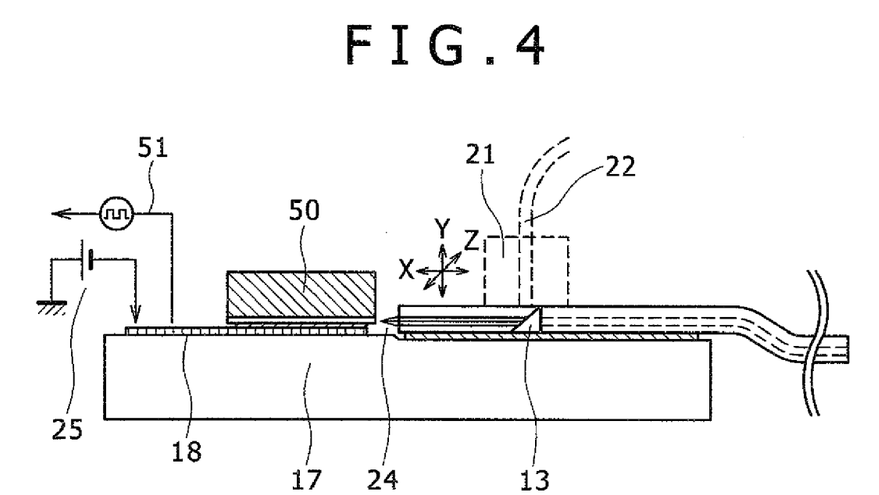
FIG. 4 is a sectional view of a planar optical waveguide array module, including an edge illuminated type photodiode array, according to a third embodiment of the present invention.

FIG. 4 is a sectional view of a planar optical waveguide array module, including an edge illuminated type photodiode array, according to a third embodiment of the present invention. To fabricate the planar optical waveguide array module according to the third embodiment, an edge illuminated type photodiode array 50 is driven by applying a bias 25 (i.e. a reverse bias in this case) thereto via electrode pads 19 and electrical wirings 18. With the edge illuminated type photodiode array 50 thus driven, optical signals 24 outputted from optical fibers 22 are inputted to the outermost optical element channels on both sides of the edge illuminated type photodiode array 50 via the mirrors 13 for light redirection and the outermost optical waveguide channels on both sides of optical waveguide array channels. The optical axes of the edge illuminated type photodiode array 50 and the optical waveguide array 26 are then aligned while monitoring electrical signals 51 outputted, after photoelectrical conversion, from the optical element channels. The optical waveguide array 26 is fixed to a substrate 17 in such a position that the electrical signals 51 have a desired value.

Embodiment 4

Figure 5:
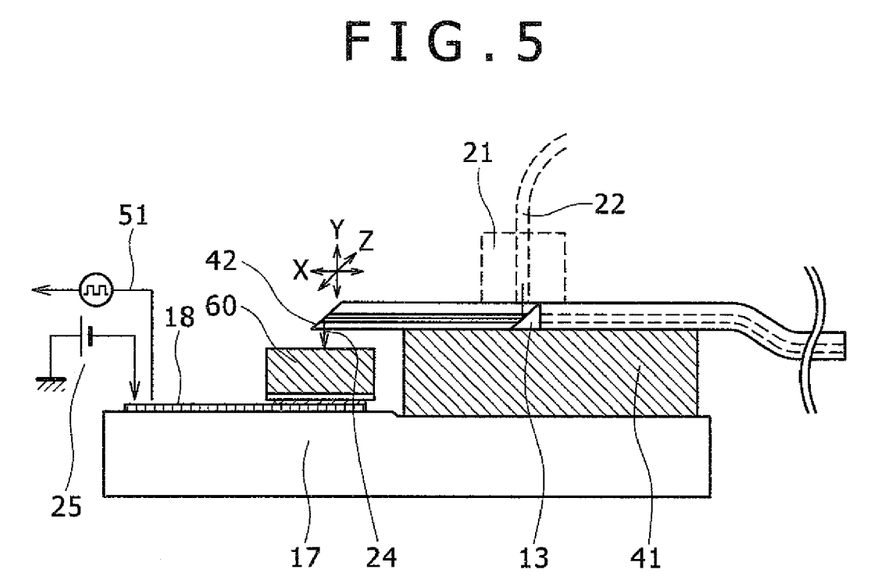
FIG. 5 is a sectional view of a planar optical waveguide array module, including a surface illuminated type photodiode array, according to a fourth embodiment of the present invention.

FIG. 5 is a sectional view of a planar optical waveguide array module, including a surface illuminated type photodiode array, according to a fourth embodiment of the present invention. In the fourth embodiment, the optical element array mounted on a substrate 17 is a surface illuminated type photodiode array 60 which receives light coming in a vertical direction to the element surface. To fabricate the planar optical waveguide array module according to the fourth embodiment, the surface illuminated type photodiode array 60 is driven by applying a bias 25 (i.e. a reverse bias in this case) thereto via electrode pads 19 and electrical wirings 18. With the surface illuminated type photodiode array 60 thus driven, optical signals 24 outputted from optical fibers 22 are inputted to the outermost optical element channels on both sides of the surface illuminated type photodiode array 60 via first mirror structures 13 for light redirection, the outermost optical waveguide channels on both sides of optical waveguide array channels, and a second mirror structure 42 provided in an end portion of the optical waveguide array. The optical axes of the surface illuminated type photodiode array 60 and the optical waveguide array 26 are then aligned while monitoring electrical signals 51 outputted, after photoelectrical conversion, from the optical element channels. The optical waveguide array 26 is fixed to a support member 41 on the substrate 17 in such a position that the electrical signals 51 have a desired value.

Embodiment 5

Figure 6A:
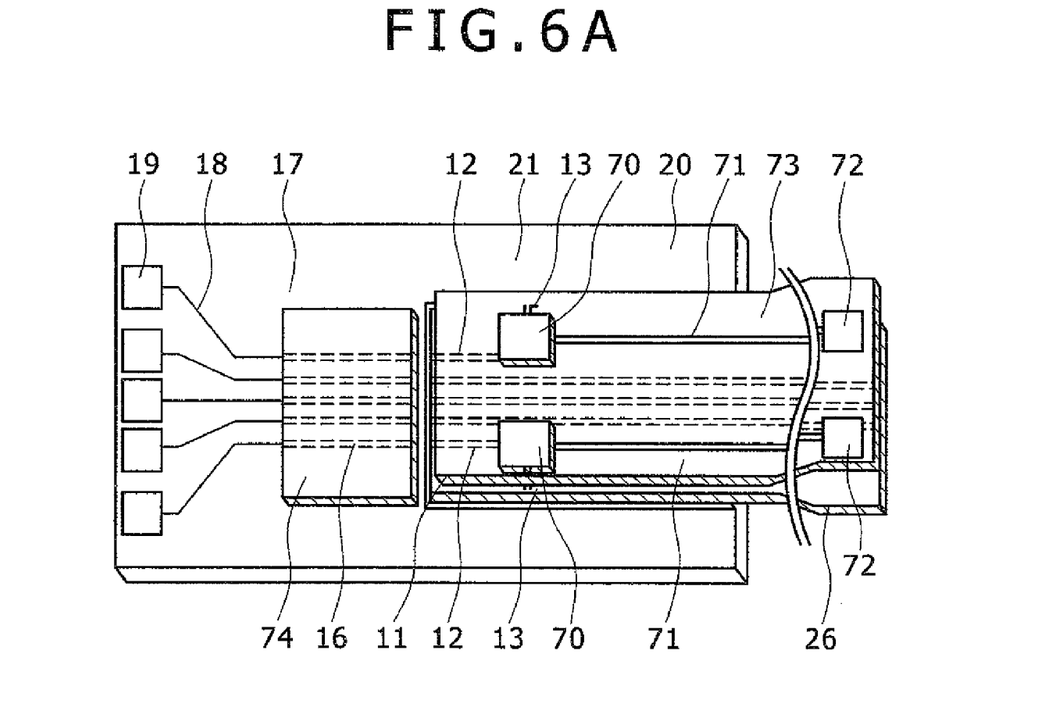
FIG. 6A is a plan view of a planar optical waveguide array module, including a flexible printed circuit board formed on an optical waveguide array, according to a fifth embodiment of the present invention.
Figure 6B:
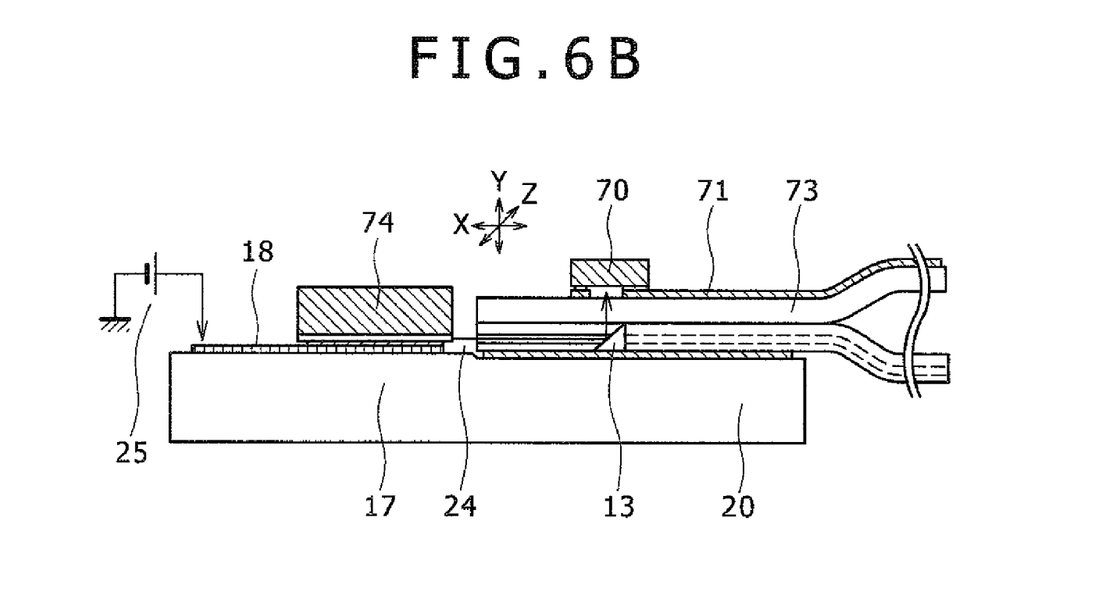
FIG. 6B is a sectional view of the planar optical waveguide array module shown in FIG. 6A.

FIGS. 6A and 6B are a plan view and a sectional view, respectively, of a planar optical waveguide array module, including a flexible printed circuit board formed on the optical waveguide array, according to a fifth embodiment of the present invention.

In the fifth embodiment, a flexible printed circuit board 73 having electrical wirings 71 is formed on the surface of an optical waveguide array 26. Light-receiving elements 70 are mounted on the surface of the flexible printed circuit board 73, each of the light-receiving elements 70 being positioned directly above a mirror structure 13 for light redirection provided for each of the outermost optical waveguide channels 12 on both sides of optical waveguide array channels. In this configuration, optical signals coming through the outermost optical element channels 16 on both sides of a laser element array 74 are inputted to the light-receiving elements 70 via the outermost optical waveguide channels 12 on both sides of the optical waveguide array channels 11, the mirror structures 13, and the flexible printed circuit board 73. Subsequently, the optical axes of the laser element array 74 and the optical waveguide array 26 are aligned while monitoring electrical signals transmitted, after being subjected to photoelectrical conversion at the light-receiving elements 70, through electrical wirings 71 and electrode pads 72. The optical waveguide array 26 is then fixed to a substrate 17. In this configuration, the optical signals outputted from the optical waveguide channels 12 are transmitted through the flexible printed circuit board 73, so that the flexible printed circuit board 73 is required to be of a material with a transmittance of at least 10% for the emission wavelength of the laser element array 74. Even after the optical waveguide array 26 and the flexible printed circuit board 73 are mounted on the substrate 17, the light-receiving elements 70 can be used as monitor photodiodes for the laser element array 74.

Figure 7:
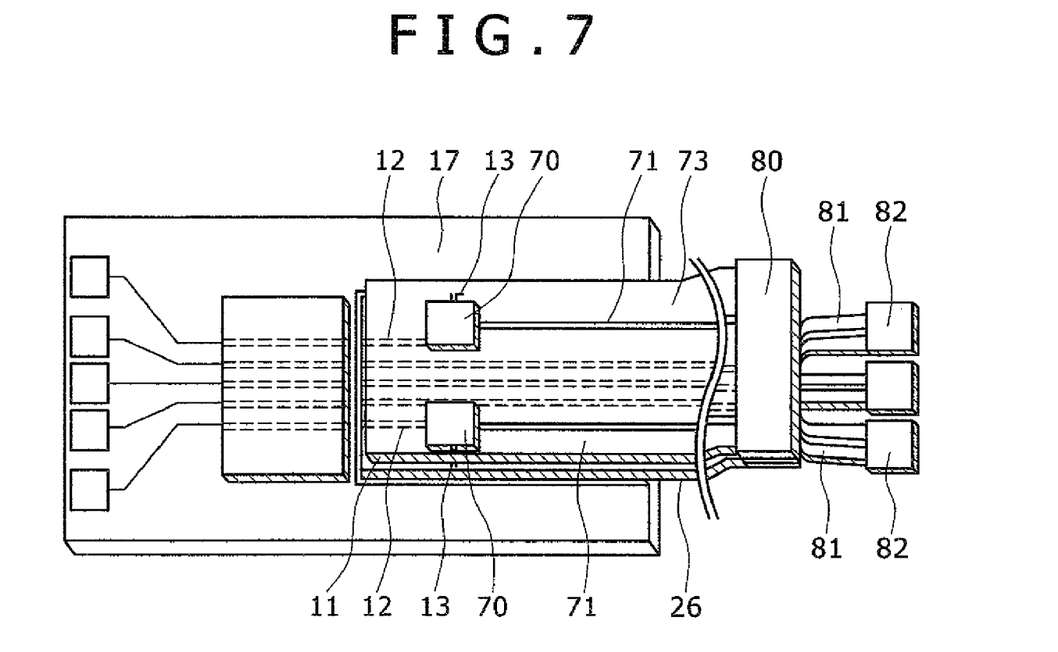
FIG. 7 shows a planar optical waveguide array module including an optical waveguide array and a flexible printed circuit board, each of which is attached, at an end thereof, with a connector or connectors.

FIG. 7 shows a planar optical waveguide array module including an optical waveguide array which is attached, at an end thereof, with connectors and a flexible printed circuit board which is attached, at an end thereof, with a connector. In this example, optical connectors 82 are attached to the other end than the one on a substrate 17 of an optical waveguide array 26, and an electrical connector 80 is attached to the end farther from light-receiving elements 70 for optical signal monitoring of the flexible printed circuit board 73. This configuration allows the planar optical waveguide array module to function as a receptacle type optical module to and from which signal input/output terminals can be connected and disconnected, so that the ease of use of the module is enhanced. Furthermore, in this configuration, the optical waveguide channels 81 of the optical waveguide array 26 are, as shown in FIG. 7, separated outside the substrate 17, so that the module allows optical signals of different channels to be individually taken out.

Embodiment 6

Figure 8:
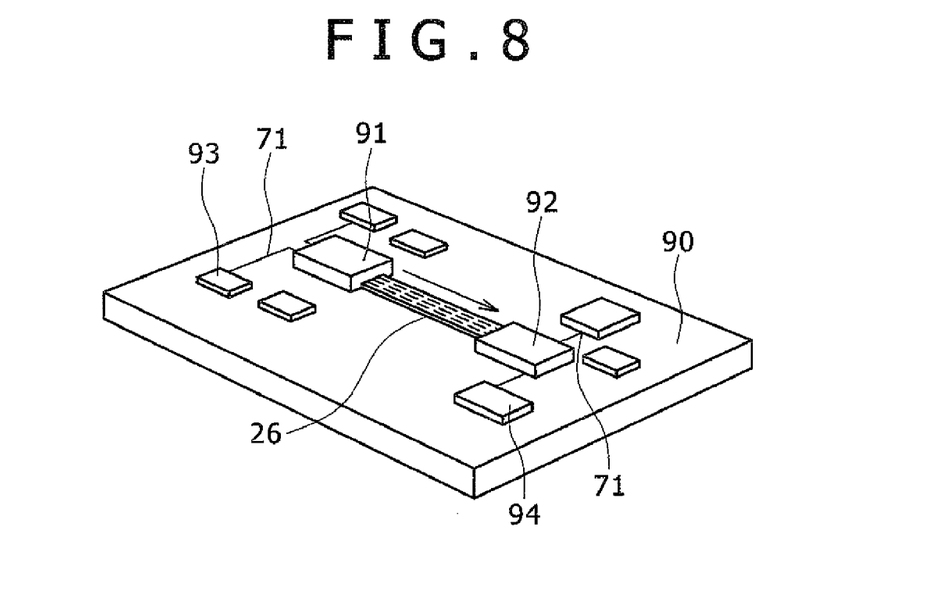
FIG. 8 is a perspective view of an Opto Electronic Integrated Circuit including planar optical waveguide array modules formed on a board according to a sixth embodiment of the present invention.

FIG. 8 is a perspective view of an Opto Electronic Integrated Circuit including planar optical waveguide array modules formed on a board according to a sixth embodiment of the present invention. In the sixth embodiment, a first planar optical waveguide array module 91 for use as a transmitter including a laser element array, an optical waveguide array 26, and a second optical waveguide array module 92 for use as a receiver including a light-receiving element array are arranged on a board 90 with the second planar optical waveguide array module 92 spaced from the first planar optical waveguide array module 91. The operation of this circuit can be described briefly as follows: an electric signal from an integrated circuit 93 electrically connected to the first planar optical waveguide array module 91 via an electrical wiring 71 is converted into an optical signal at the first planar optical waveguide array module 91; the optical signal is then transmitted through the optical waveguide array 26 to the second planar optical waveguide array module 92 where it is reconverted into an electrical signal; and the electrical signal is then transmitted through an electrical wiring 71 to an integrated circuit 94 to be processed there.

What is claimed is:

1. A method of fabricating an optical module comprising planar optical waveguide array, the method comprising the steps of:

preparing an optical waveguide array formed on a flexible substrate, the optical waveguide array including a first optical waveguide channel group including at least two optical waveguide channels each having an optical wiring core which is enclosed in a cladding layer and which is formed of a material with a refractive index higher than that of the cladding layer and a second optical waveguide channel group including a pair of optical waveguide channels juxtaposed to the juxtaposed outermost optical waveguide channels on both sides of the first optical waveguide channel group, respectively, the flexible substrate being of a material which allows the first optical waveguide channel group and the second optical waveguide channel group to be arbitrarily bent; and preparing an optical element array formed on an optical module substrate, the optical element array including a first optical element array including at least two juxtaposed optical elements and a second optical element array including a pair of optical elements juxtaposed to the outermost optical elements on both sides of the first optical element array, respectively;

wherein each of the optical waveguide channels included in the second optical waveguide channel group has a first mirror structure which redirects light coming through the optical waveguide channel into a direction perpendicular to the optical waveguide channel; and wherein, with the first optical element array and the second optical element array driven by a bias applied thereto, the optical waveguide array is brought near the optical element array, optical axes of the second optical waveguide channel group and the second optical element array are aligned while monitoring an output signal outputted from the second optical element array and redirected by the first mirror structure or an output signal redirected by the first mirror structure and outputted from the second optical waveguide channel group, and the optical waveguide array is fixed to the optical module substrate in such a position that the output signal being monitored has a desired value.

2. The method of fabricating an optical module comprising planar optical waveguide array according to claim 1, wherein the flexible substrate has positioning guide holes, one of the positioning guide holes being formed in a part between one of the channels of the second optical waveguide channel group and one side of the flexible substrate, the other of the positioning guide holes being formed in a part between the other of the channels of the second optical waveguide channel group and the other side of the flexible substrate, and wherein the output signal is monitored, via the first mirror structure, using an optical fiber connector having a guide pin structure which fits in one of the positioning guide holes.

3. The method of fabricating an optical module comprising planar optical waveguide array according to claim 1, wherein each of the first optical element array and the second optical element array includes a laser element which emits light when a bias is applied thereto.

4. The method of fabricating an optical module comprising planar optical waveguide array according to claim 1, wherein the optical element array is a light-receiving element array for converting an incoming optical signal into an electrical signal; and wherein an optical signal outputted from the second optical waveguide channel group after being redirected by the first mirror structure is converted into an electrical signal at the light-receiving element array, and the optical axes of the second optical waveguide channel group and the second optical element array are aligned while monitoring the electrical signal.

5. The method of fabricating an optical module comprising planar optical waveguide array according to claim 1, wherein another flexible substrate is provided on which a light-receiving element for receiving light coming after being redirected by the first mirror structure is mounted and an electrical wiring electrically connected to the light-receiving element is provided and which is stacked with the flexible substrate to be partly in contact with the flexible substrate;

wherein each of the first optical element array and the second optical element array is a laser element array which emits light when a bias is applied thereto; and wherein optical axes of the second optical waveguide channel group and the second optical element array are aligned while monitoring an electrical signal generated by photoelectrical conversion at the light-receiving element, and the optical waveguide array is fixed to the optical module substrate in such a position that the output signal has a desired value.

6. The method of fabricating an optical module comprising planar optical waveguide array according to claim 5, wherein the flexible substrate and the other flexible substrate are of a material with a transmittance of at least 10% for an emission wavelength of the laser element array.

7. The method of fabricating an optical module comprising planar optical waveguide array according to claim 1, wherein the optical waveguide array is formed of a polymer material.

8. The method of fabricating an optical module comprising planar optical waveguide array according to claim 1, wherein a support member is provided between the optical waveguide array and the optical module substrate, the support member being of a material with a thermal expansion coefficient equal to or intermediate between those of the optical waveguide array and the optical module substrate.

9. A method of fabricating an optical module comprising planar optical waveguide array, the method comprising the steps of:

preparing an optical waveguide array formed on a flexible substrate, the optical waveguide array including a first optical waveguide channel group including at least two optical waveguide channels each having an optical wiring core which is enclosed in a cladding layer and which is formed of a material with a refractive index higher than that of the cladding layer and a second optical waveguide channel group including a pair of optical waveguide channels juxtaposed to the juxtaposed outermost optical waveguide channels on both sides of the first optical waveguide channel group, respectively, the flexible substrate being of a material which allows the first optical waveguide channel group and the second optical waveguide channel group to be arbitrarily bent; and preparing an optical element array formed on an optical module substrate, the optical element array including a first optical element array including at least two juxtaposed optical elements and a second optical element array including a pair of optical elements juxtaposed to the outermost optical elements on both sides of the first optical element array, respectively;

wherein the second optical waveguide channel group is provided, at an input and output end thereof, with a second mirror structure which redirects light inputted or outputted in a direction perpendicular to the optical module substrate into a direction parallel with the optical module substrate to allow the light to be transmitted through an optical waveguide of the second optical waveguide channel group; and wherein optical axes of the second optical waveguide channel group and the second optical element array are aligned while monitoring an output signal transmitted through the second mirror structure and redirected by the first mirror structure, and the optical waveguide array is fixed to the optical module substrate in such a position that the output signal has a desired value.

10. The method of fabricating an optical module comprising planar optical waveguide array according to claim 9, wherein each of the first optical element array and the second optical element array is a surface light-emitting diode array which emits light in a vertical direction to the element surface.

11. The method of fabricating an optical module comprising planar optical waveguide array according to claim 9, wherein each of the first optical element array and the second optical element array is a light-receiving element array which converts an input optical signal into an electrical signal.

12. An optical module comprising planar optical waveguide array, comprising:

a first flexible substrate on which a first optical waveguide channel group and a second optical waveguide channel group are mounted, the first optical waveguide channel group including at least two optical waveguide channels each having an optical wiring core which is enclosed in a cladding layer and which is formed of a material with a refractive index higher than that of the cladding layer, the second optical waveguide channel group including a pair of optical waveguide channels juxtaposed to the juxtaposed outermost waveguide channels on both sides of the first optical waveguide channel group, respectively, each of the pair of optical waveguide channels being provided with a first mirror structure for redirecting light being transmitted therein into a direction perpendicular to a direction of light transmission therein;

a second flexible substrate provided with a light-receiving element for receiving light redirected by the first mirror structure and an electrical wiring electrically connected to the light-receiving element;

an optical waveguide array including the first flexible substrate and the second flexible substrate with one laid over the other to be partly in contact with each other; and an optical element array provided on an optical module substrate, the optical element array including a first optical element array including at least two juxtaposed optical elements and a second optical element array including a pair of optical elements juxtaposed to the outermost optical elements on both sides of the first optical element array, respectively;

wherein each of the first optical element array and the second optical element array is a laser element array which emits light when a bias is applied thereto; and wherein the light-receiving element is provided in an area on the second flexible substrate, the area including an optical path of the first mirror structure.

13. The optical module comprising planar optical waveguide array according to claim 12, wherein an end portion of the first flexible substrate mounted on the optical module substrate is connected to an optical connector, and wherein an end portion of the second flexible substrate on which the light-receiving element is mounted is connected to an electrical connector.

14. The optical module comprising planar optical waveguide array according to claim 13, wherein the optical waveguide channels of the optical waveguide array are separated at their parts away from the optical module substrate.

* * * * *